United States Patent
Yu (10) Patent No.: US 7,318,197 B2
(45) Date of Patent: Jan. 8, 2008

(54) APPARATUS FOR DISPLAYING INTERNET SITE SEARCH MENU OF VIDEO APPARATUS HAVING INTERNET FUNCTION AND METHOD THEREFOR

(75) Inventor: Won-Uk Yu, Daeku (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 09/989,397

(22) Filed: Nov. 21, 2001

(65) Prior Publication Data
US 2002/0063682 A1 May 30, 2002

(30) Foreign Application Priority Data
Nov. 27, 2000 (KR) .............................. 2000-70990

(51) Int. Cl.
*G06F 3/00* (2006.01)
(52) U.S. Cl. .................................................... 715/721
(58) Field of Classification Search ........ 345/716–722, 345/810–811; 725/37–61; 715/719, 720, 715/721
See application file for complete search history.

(56) References Cited

U.S. PATENT DOCUMENTS

| | | | | |
|---|---|---|---|---|
| 5,907,845 A | * | 5/1999 | Cox et al. ................... | 707/102 |
| 6,172,677 B1 | * | 1/2001 | Stautner et al. ............. | 715/716 |
| 6,195,692 B1 | * | 2/2001 | Hsu ........................... | 725/110 |
| 6,388,714 B1 | * | 5/2002 | Schein et al. ............... | 348/563 |
| 6,411,307 B1 | * | 6/2002 | Rosin et al. ................. | 345/716 |
| 6,518,984 B1 | * | 2/2003 | Maeckel et al. ............ | 715/786 |
| 6,631,523 B1 | * | 10/2003 | Matthews et al. ............ | 725/53 |
| 2001/0012024 A1 | * | 8/2001 | Rosin et al. ................. | 345/841 |

* cited by examiner

*Primary Examiner*—Kristine Kincaid
*Assistant Examiner*—Thanh Vu
(74) *Attorney, Agent, or Firm*—Ked & Associates, LLP (57) ABSTRACT

A method for displaying an Internet site search menu of a video apparatus having an Internet function, which is capable of easily selecting and editing a plurality of Internet sites on the screen of the video apparatus, is provided. The method for displaying the video and audio information of an Internet site on the screen of a video apparatus includes the steps of generating an Internet site search menu comprising a channel guide window for arranging channel numbers, in which the addresses of Internet sites are previously registered, and the titles of the Internet sites respectively corresponding to the channel numbers when an Internet channel guide key signal is input by a user and a channel number range designation window for designating the channel numbers to be in predetermined ranges and arranging the channel numbers and displaying the Internet site search menu on the screen of the video apparatus.

24 Claims, 7 Drawing Sheets

| SELECTION | CHANNEL | TITLE | | GOTO | RANGE |
|---|---|---|---|---|---|
| EZ | 1 | KBS | | ▶ | 1~10 |
| EZ | 2 | MBC | EZ CHANNEL 08 | ▶ | 11~20 |
| EZ | 3 | SBS | | ▶ | 21~30 |
| | 4 | LYCOS | | ▶ | 31~40 |
| EZ | 5 | NAVER | | ▶ | 41~50 |
| EZ | 6 | CHOLLIAN | | ▶ | 51~60 |
| EZ | 7 | DREAMWIZ | | ▶ | 61~70 |
| EZ | 8 | CHOSUN IIBO | | ▶ | 71~80 |
| EZ | 9 | HANKYORE NEWSPAPER | | ▶ | 81~90 |
| EZ | 10 | SPORTS SEOUL | | ▶ | 91~99 |

| REGISTRATION | DELETION | MODIFICATION | CLOSE |

| SELECTION | CHANNEL | TITLE | GOTO | RANGE |
|---|---|---|---|---|
| EZ | 1 | KBS | ▶ | 1~10 |
| EZ | 2 | MBC | ▶ | 11~20 |
| EZ | 3 | SBS | ▶ | 21~30 |
|  | 4 | LYCOS | ▶ | 31~40 |
| EZ | 5 | NAVER | ▶ | 41~50 |
| EZ | 6 | CHOLLIAN | ▶ | 51~60 |
| EZ | 7 | DREAMWIZ | ▶ | 61~70 |
| EZ | 8 | CHOSUN IIBO | ▶ | 71~80 |
| EZ | 9 | HANKYORE NEWSPAPER | ▶ | 81~90 |
| EZ | 10 | SPORTS SEOUL | ▶ | 91~99 |

EZ CHANNEL 08

REGISTRATION | DELETION | MODIFICATION | CLOSE

FIG. 8

| SELECTION | CHANNEL | TITLE | GOTO | RANGE |
|---|---|---|---|---|
| EZ | 11 | LG HOME SHOPPING | ▶ | 1~10 |
| EZ | 12 | YES 24 | ▶ | 11~20 |
| EZ | 13 | BEST BUYER | ▶ | 21~30 |
|  | 14 | GARDEN FLOWER | ▶ | 31~40 |
| EZ | 15 | TICKET LINK | ▶ | 41~50 |
| EZ | 16 | TITLE LG ELECTRONICS | ▶ | 51~60 |
| EZ | 17 | ADDRESS www.lge.com | ▶ | 61~70 |
| EZ | 18 | CHANNEL 20 ▲▼ CONFIRMATION CANCEL | ▶ | 71~80 |
| EZ | 19 | NINE4U | ▶ | 81~90 |
| EZ | 20 |  | ▶ | 91~99 |

REGISTRATION | DELETION | MODIFICATION | CLOSE

APPARATUS FOR DISPLAYING INTERNET SITE SEARCH MENU OF VIDEO APPARATUS HAVING INTERNET FUNCTION AND METHOD THEREFOR

BACKGROUND OF THE INVENTION

1. Field of the Invention

The present invention relates to a video apparatus, and more particularly, to a method for displaying a menu for searching Internet sites of a video apparatus having an Internet function such as an Internet television or a television connected to an armored set-top box.

2. Description of the Background Art

The Internet through a television is commonly used. There exist Internet sites, whose number is much larger than the number of common broadcast channels. The Internet sites are currently increasing in a geometrical progression. Also, in order to connect the Internet through the television, an armored set-top box is connected to the television or the television equipped with an Internet module is connected to a telephone line, a local area network (LAN), or a high-speed dedicated line. At this time, the structures of the set-top box and the Internet module loaded in the television are identical to each other excluding that the locations of the set-top box and the Internet module loaded in the television are different from each other.

The structure of the armored set-top box of the television having the Internet function will now be described with reference to FIG. 1.

Figure 1:
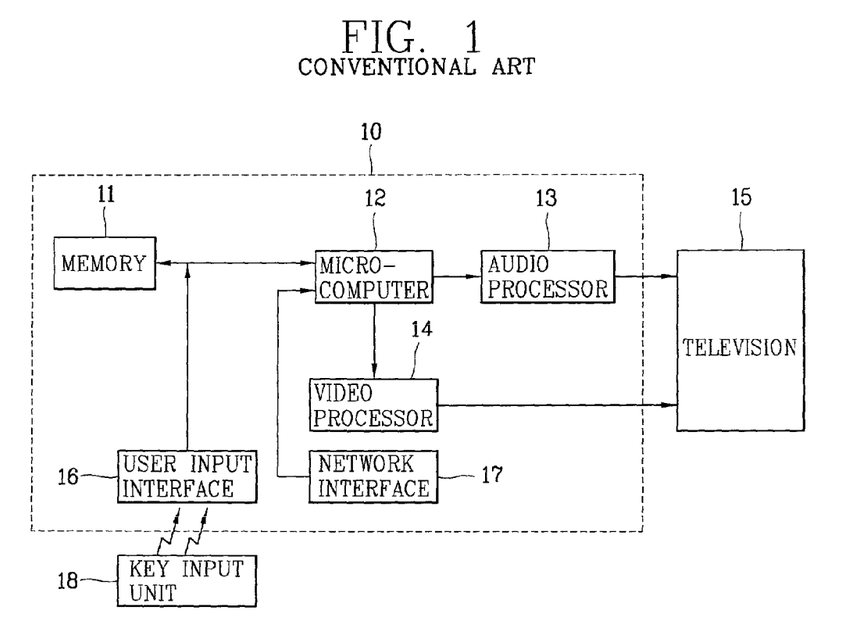
FIG. 1 is a block diagram showing the structure of a set-top box connected to a television according to a conventional technology.

FIG. 1 is a block diagram showing the structure of a set-top box connected to a television according to a conventional technology.

As shown in FIG. 1, a set-top box 10 connected to a television 15 includes a network interface 17 for transmitting and receiving video and audio information through a network such as the telephone line, the LAN, or the Internet dedicated line, a user input interface 16 for receiving a user request signal output from a key input unit 18 such as a wireless keyboard, a remote controller, or a wireless mouse, a memory 11 for storing user set information, basic operation programs, or temporary information, an audio processor 13 for signal processing audio information input to the network interface 17 and outputting the audio information to a speaker (not shown) of the television 15, a video processor 14 for signal processing video information input to the network interface 17 and outputting the video information to the Braun tube of the television 15, and a microcomputer 12 for controlling the respective components in the set-top box in accordance with the user request signal. The operation of the set-top box 10 connected to the television will now be described.

When a user selects an Internet mode during viewing a broadcast program through the television 15, the set-top box 10 receives the video and audio signals of a predetermined Internet site that is previously set according to the control of the microcomputer 12 through the network interface 17 and transmits the video and audio signals to the television 15 after performing a series of signal processes through the video processor 14 and the audio processor 13 inside the set-top box 10.

The television 15 outputs the video and audio signals to the Braun tube and the speaker of the television 15 through a video and audio processor (not shown) inside the television 15. The user can select a predetermined Internet site by inputting a desired Internet address through the key input unit 18, that is, a wireless keyboard. The video and audio signal corresponding to the selected Internet site is signal processed in the set-top box and is output to the Braun tube and the speaker of the television 15.

In the case of the television, in which the Internet module is loaded, a method of displaying the Internet site is the same.

However, in a conventional technology, the user cannot easily search or select the Internet sites on a television screen because the plurality of Internet sites are not systematically managed. That is, in the television having the Internet function according to the conventional technology, it is not possible to systematically manage the Internet sites desired by the user among a plurality of Internet sites and to easily search, select, or edit the Internet sites on the television screen, it is inconvenient to use the Internet.

SUMMARY OF THE INVENTION

Therefore, an object of the present invention is to provide an apparatus for displaying an Internet site search menu of a video apparatus having an Internet function, which is capable of letting a user easily search, select, and edit a plurality of Internet sites on a television screen, and a method therefor.

To achieve these and other advantages and in accordance with the object of the present invention, as embodied and broadly described herein, there is provided an apparatus for displaying the video and audio information of an Internet site and displaying the received video and audio information on the screen of the video apparatus, the apparatus comprising a memory for storing Internet site information comprising the video information, the audio information, and the initial screen of the previously stored Internet site corresponding to the address of the Internet site, a microcomputer for receiving the video and audio information corresponding to the address of the Internet site and outputting a control signal when an Internet channel guide key signal is input by the user, an Internet site search menu generator for receiving the control signal and generating and outputting an Internet site search menu, a video processor for displaying the initial screen of the Internet site or the Internet site search menu on the screen of the video apparatus according to the control signal, and an audio processor for outputting the Internet site search menu by audio according to the control signal.

There is provided a method for displaying the video and audio information of an Internet site on the screen of a video apparatus, comprising the steps of generating an Internet site search menu comprising a channel guide window for arranging channel numbers, in which the addresses of Internet sites are previously registered, and the titles of the Internet sites respectively corresponding to the channel numbers when an Internet channel guide key signal is input by a user and a channel number range designation window for designating the channel numbers to be in predetermined ranges and arranging the channel numbers and displaying the Internet site search menu on the screen of the video apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A preferred embodiment of a method for displaying an Internet site search menu of a video apparatus having an Internet function according to the present invention will now be described in detail with reference to FIGS. 2 through 7.

Figure 2:
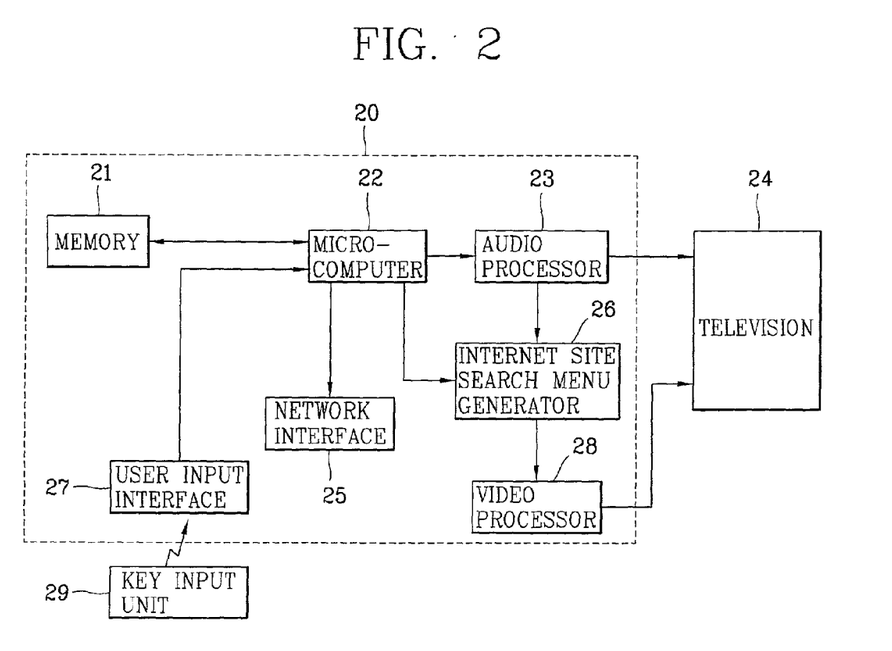
FIG. 2 is a block diagram showing an apparatus for displaying an Internet site search menu of a video apparatus having an Internet function according to the present invention.
Figure 3:
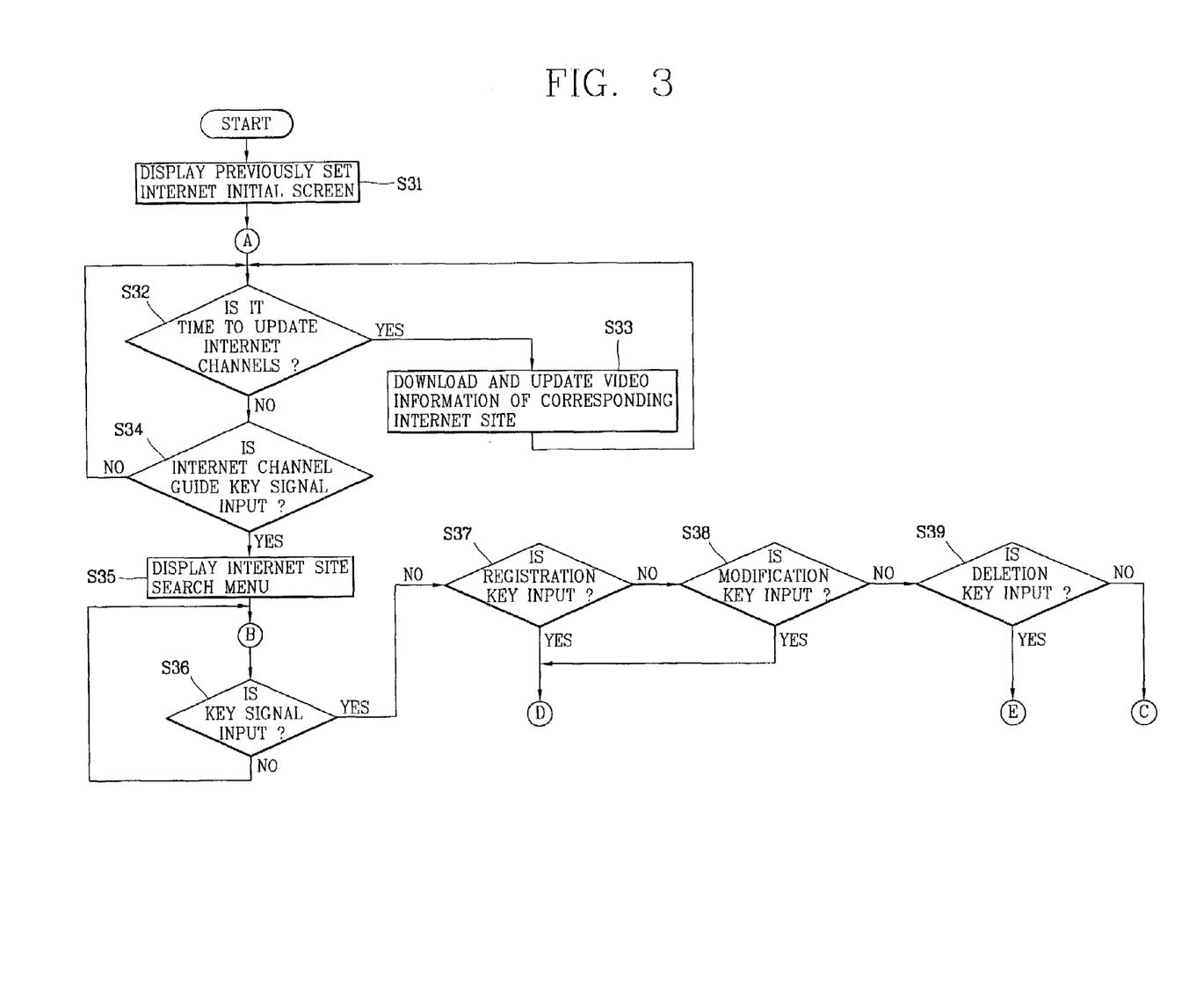
FIGS. 3 through 6 are flowcharts showing a method for displaying the Internet site search menu of the video apparatus having the Internet function according to the present invention.
Figure 4:
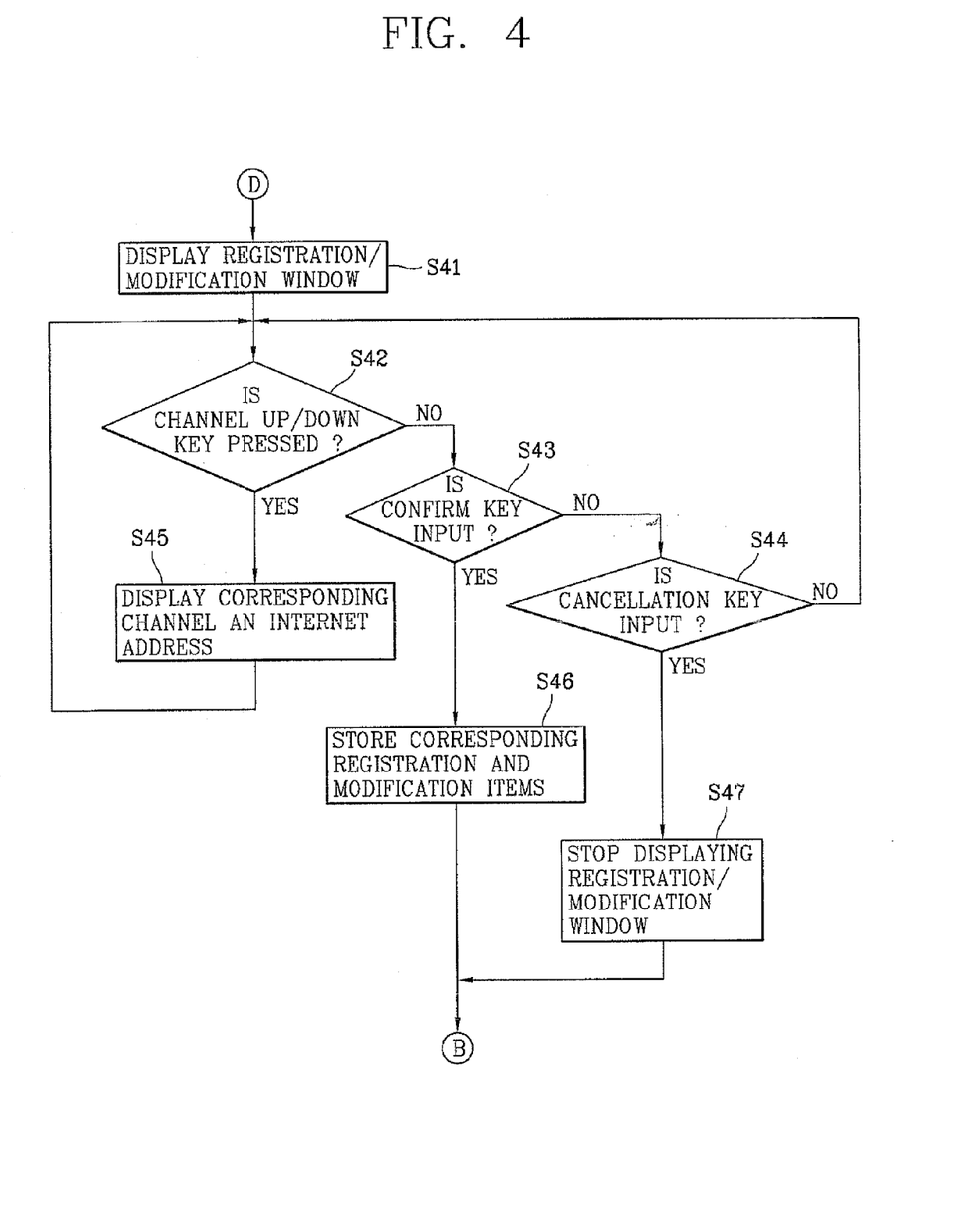
Figure 5:
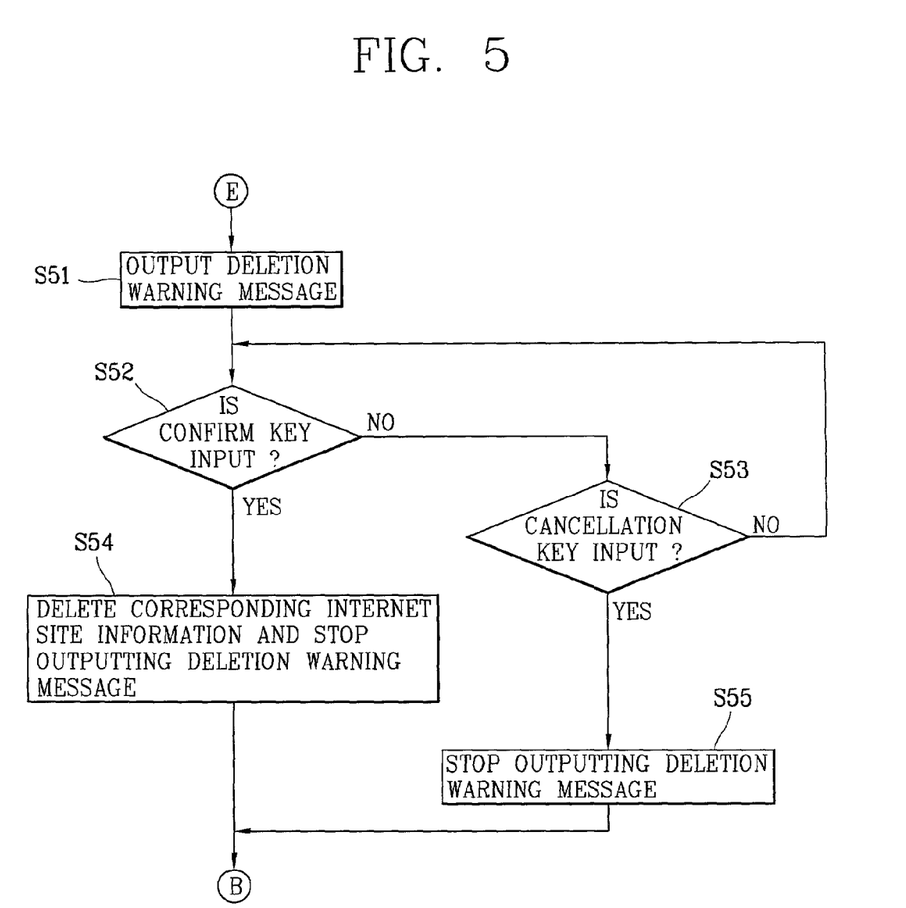
Figure 6:
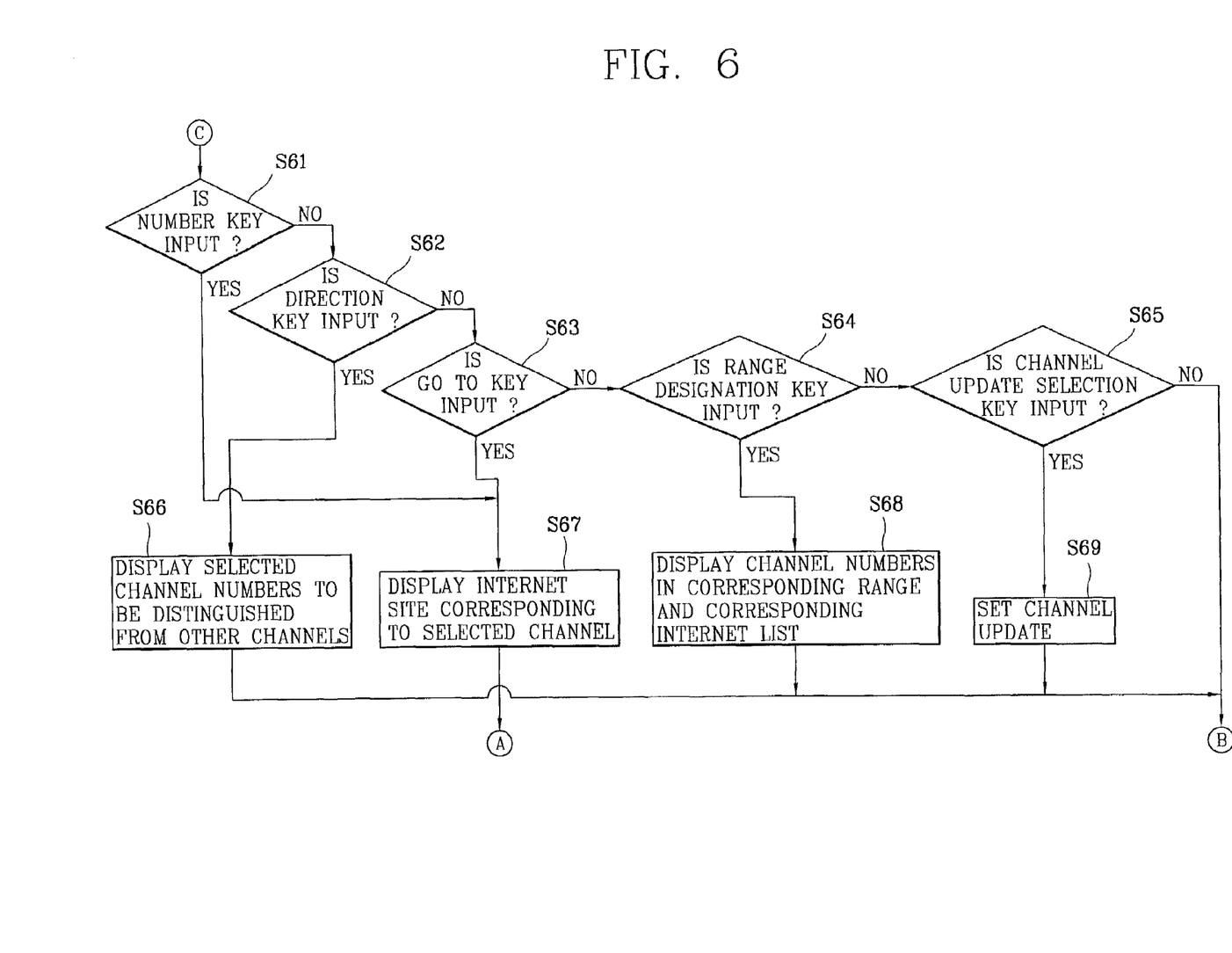

FIG. 2 is a block diagram showing an apparatus for displaying an Internet site search menu of a video apparatus having an Internet function according to the present invention.

As shown in FIG. 2, the apparatus for displaying the Internet site search menu of the video apparatus having the Internet function includes a key input unit 29 for outputting an Internet channel guide key signal when a user selects an Internet mode, a user input interface 27 for receiving the Internet channel guide key signal, a network interface 25 for transmitting and receiving video and audio information through a network such as a telephone line, a local area network (LAN), or an Internet dedicated line, a memory 21 for storing Internet site information including video information, audio information, and the initial screen of an Internet site corresponding to Internet addresses, a microcomputer 22 for receiving video and audio information corresponding to the address of the Internet site previously stored in the memory 21 and outputting a control signal including the video and audio signals when the Internet channel guide key signal is received from the user input interface 27, an Internet site search menu generator 26 for receiving the control signal and generating and outputting an Internet site search menu, a video processor 28 for displaying the previously stored initial screen (the initial screen of the Internet site) on the screen of a television according to the control signal output from the microcomputer 22 or displaying the Internet site search menu on the screen of the television, and an audio processor 23 for outputting the Internet site search menu by audio according to the control signal output from the microcomputer 22. The video apparatus is an armored set-top box or a television, in which an Internet module is loaded. The operation of the apparatus for displaying the Internet site search menu of the video apparatus having the Internet function will now be described in detail with reference to FIGS. 3 through 6.

FIGS. 3 through 6 are flowcharts showing a method for displaying an Internet site search menu of a video apparatus having an Internet function according to the present invention.

When a user selects the Internet mode, the microcomputer 22 displays the video and audio information or the initial screen of the Internet site that is previously set and stored corresponding to the address of the Internet site previously stored in the memory 21 on the screen of a television (S31).

When the video information, the audio information, or the initial screen of the stored Internet site corresponding to the previously set Internet address is displayed on the screen of the television, the microcomputer 22 determines whether it is time to update the channels of the respective Internet sites (S32). The channels of the respective Internet sites refer to channels previously stored in the memory 21 with the address of a predetermined Internet site assigned to each channel (channel numbers in the Internet site search menu).

When the time to update the channels of the Internet sites has lapsed, the microcomputer 22 periodically updates the information of the Internet sites (the initial screen of the Internet sites) corresponding to the channels of the Internet sites (S33). That is, the user can see the recent information of the Internet site without downloading by displaying the recent information of the Internet site corresponding to the channel of the previously stored Internet site when the user selects the channel of the Internet site.

When the time to update the channels of the Internet sites has not lapsed, the microcomputer 22 determines whether the Internet channel guide key signal (or an Internet start signal) is input (S34). That is, when the user presses the Internet channel guide key (not shown) of the key input unit 30 or clicks the Internet channel guide icon (not shown) on the initial screen of the Internet site (S34), the microcomputer 22 displays the Internet site search menu (S35). The Internet site search menu will now be described in detail with reference to FIG. 7.

Figure 7:
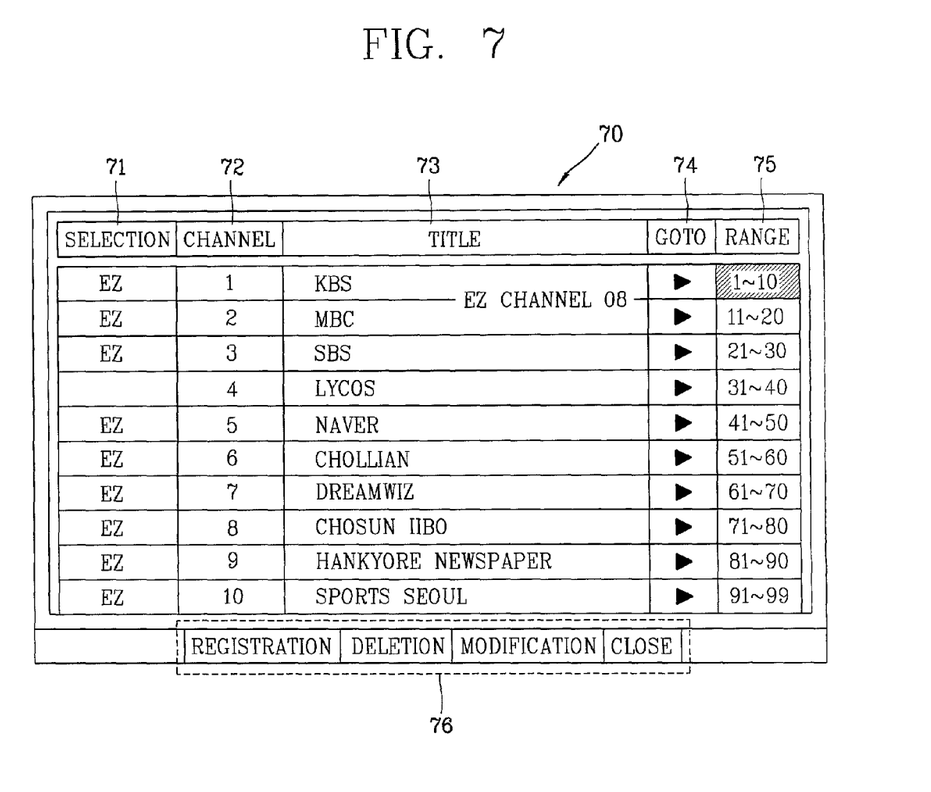
FIG. 7 shows an Internet site search menu according to the present invention.

FIG. 7 shows the Internet site search menu according to the present invention.

As shown in FIG. 7, an Internet site search menu 70 includes channel guide windows 72 and 73 for arranging the channel numbers, with which the addresses of the Internet sites are previously registered, and the titles of the Internet sites corresponding to the channel numbers, a goto window 74 formed of goto keys for directly moving to the addresses of the Internet sites of the respective channels of the channel guide windows 72 and 73, a channel number range designation window 75 in one side of the goto window 74 for designating the channel numbers to be in a predetermined range and arranging the channel numbers, a channel update selection window 71 for periodically updating the channel of the Internet site desired by the user among the respective channels, and a registration/modification/deletion window 76 for registering, modifying, or deleting the Internet site desired by the user by channel numbers. The channel number selected by the user and the title of the Internet site corresponding to the channel number selected by the user in the channel guide windows 72 and 73 are displayed to be different from the channel numbers that are not selected by the user and the titles of the Internet sites corresponding to the channel numbers that are not selected by the user in color and brightness and to have three-dimensional outlines. The channel number range designation window 75 sequentially displays channels such that each of predetermined numbers of channels such as channels 1 through 10, channels 11 through 20, and channels 21 through 30, etc. form a unit and displays the part corresponding to the channel range selected by the user to be different from other channel ranges in color and brightness and to have a three-dimensional outline.

The microcomputer 22 determines whether a key signal is input when a user inputs a predetermined key in the Internet site search menu (S36). The method for displaying the Internet site search menu when the key signal is input from the predetermined key will now be sequentially described.

When the user inputs a register key or a modification key in the registration/modification/deletion window 76 (S37, S38 and S39), the microcomputer 22 outputs a control signal including the video information stored in the memory 21 to an Internet site search menu generator 26.

The Internet site search menu generator 26 receives the control signal, generates a registration/modification window, and displays the registration/modification window on the screen of the television through the video processor 28 (S41). The registration/modification window will now be described in detail with reference to FIG. 8.

Figure 8:
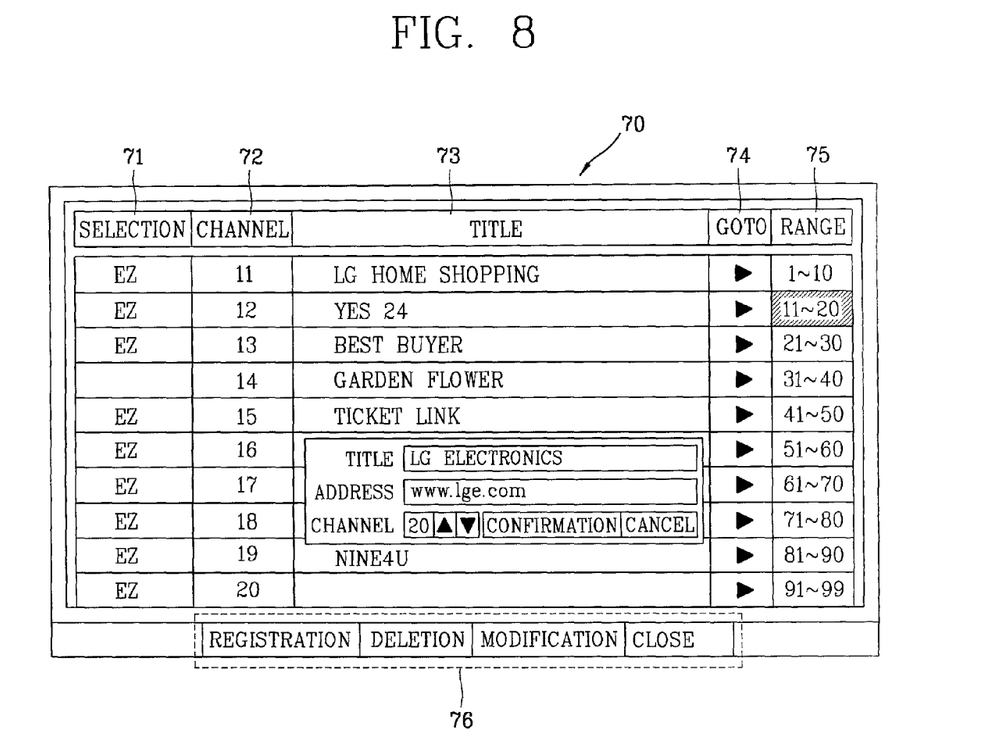
FIG. 8 shows a window for registering/modifying Internet sites according to the present invention.

FIG. 8 shows a window for registering/modifying the Internet site according to the present invention.

As shown in FIG. 8, the registration/modification window consists of windows for inputting, selecting, or changing the titles of the respective Internet sites and the address and the channel number of the corresponding Internet site, a confirm key for registering or modifying the input contents or the changed contents and confirming the registered or modified contents, and a deletion key for deleting the registered or modified contents.

When the user inputs the register key in order to register a specific Internet site, the user presses a channel up/down key (S42) and detects channels that are not currently registered. At this time, when the user inputs the channel up/down key in the registration/modification window, the microcomputer 22 displays the address and the title of the Internet site previously registered in the corresponding channel on the screen of the television through the video processor 28 (S45).

When the user searches the channel that is not registered, inputs the address and the title of the Internet site through the registration/modification window, and inputs the confirm key (S43), the memory 21 stores the corresponding registration item according to the control signal, gives (assigns) a predetermined channel number to the stored registration item, and completes the channel registration (S46). At this time, when the user inputs the deletion key because he or she does not wish the channel to be registered (S44), the microcomputer 22 stops displaying the registration/modification window (S47).

When the user inputs the modification key in order to modify the Internet site previously registered in a predetermined channel, the user presses the channel up/down key (S42) and searches the channel to be modified. At this time, when the user inputs the channel up/down key, the microcomputer 22 displays the address and the title of the Internet site previously registered in the corresponding channel on the screen of the television through the video processor 28 (S45).

When the user searches the channel to be modified, inputs the modification contents through the registration/modification window, and inputs the confirm key (S43), the memory 21 stores the corresponding modification item according to the control signal and completes the channel modification. At this time, when the user inputs the cancellation key because he or she does not wish the channel to be modified (S44), the microcomputer 22 stops displaying the registration/modification window (S47) and the process returns to the step of determining whether the key signal is input (S36).

When the user inputs the deletion key (S39), the microcomputer 22 receives the corresponding video (video) or audio information stored in the memory 21 and outputs a control signal including the received video and audio information to the Internet site search menu generator 26.

The Internet site search menu generator 26 receives the control signal, generates a deletion warning message, and displays the deletion warning message on the screen of the television through the video processor 28 or outputs the audio signal corresponding to the deletion warning message to the speaker of the television through the audio processor 23 (S51). B-1

When the user inputs the confirm key (S52), the microcomputer 22 deletes the Internet site information of the corresponding channel from the memory 21 and stops displaying the warning message (S54). When the user inputs the cancellation key (S53), the microcomputer 22 stops displaying the cancellation warning message (S55) and the process returns to the step of determining whether the key signal is input (S36).

When the user inputs one among a number key, a direction key, the goto key, a range designation key, and a channel update set key, for example, the user inputs either the number key or the goto key (S61 and S63), the video processor 28 sequentially receives the video of the Internet site corresponding to the channel selected by either the number key or the goto key according to the control signal through the network interface 25, the microcomputer 22, and the Internet site search menu generator 26 and displays the video on the screen of the television (S67).

When the user inputs the direction key (up/down) in order to select a desired channel (S62), the channel number selected by the direction key (up/down) is distinguished from other channel numbers and is displayed (S66). That is, the microcomputer 22 displays the selected channel number to be different from the other channel numbers in color or to have a three-dimensional outline. The channel number currently selected on the right top is displayed in the form of on screen display (OSD).

When the user inputs a range designation key (S64), the microcomputer 22 displays the channel numbers of the corresponding channel range and the list of the titles of the corresponding Internet sites on the screen of the television through the video processor 28 (S68). For example, when the user selects the range designation window corresponding to the channel numbers 41 through 50, the list of the titles of the Internet sites corresponding to channel numbers 41 through 50 is displayed on the screen of the television.

When the user inputs a channel update selection key (S65), the microcomputer 22 cancels the update setting of the corresponding channels when the corresponding channels are set updated and displays the update setting when the corresponding channels are not set updated (S69). The channels that are set updated are displayed to be different from the channels that are not set updated in color and brightness or are marked with a predetermined character (EZ).

When the user inputs the confirm key (S52), the microcomputer 22 deletes the Internet site information of the corresponding channel from the memory 21 and stops displaying the warning message (S54). When the user inputs the deletion key (S53), the microcomputer 22 stops displaying the warning message (S55) and the process returns to the step of determining whether the key signal is input (S36).

According to the apparatus for displaying the Internet site search menu of the video apparatus having the Internet function according to the present invention and the method therefore, it is possible for the user to easily search, select, register, and edit the desired Internet site through the Internet site search menu by assigning simple channel numbers to the Internet sites and displaying the systematic and efficient Internet site search menu on the screen of the television. Accordingly, it is possible for the user to conveniently use the Internet.

Also, according to the apparatus for displaying the Internet site search menu of the video apparatus having the Internet function according to the present invention and the method therefore, it is possible for the user to directly see the recent information of the Internet site without downloading by displaying the recent information of the Internet site corresponding to the channel of the previously stored Internet site when the user selects the channel of the Internet site.

What is claimed is:

1. A method for displaying video and audio information of an Internet site on a screen of a television, comprising:
   displaying an initial screen of a recently stored Internet site on a screen of the television when a user selects an Internet mode;
   generating an Internet site search menu when an Internet channel guide key signal is input by the user, said search menu including a channel guide window for arranging channel numbers corresponding to previously registered addresses of Internet sites, and titles of the Internet sites, and a channel number range designation window for arranging the channel numbers within the channel guide window, wherein the Internet site search menu further includes a channel update selection window for periodically updating the video and audio information of the Internet site corresponding to the channel number desired by the user among the channel numbers; and
   displaying the Internet site search menu on the screen of the television, wherein a channel number has a one-to-one correspondence to a title of an Internet site, and the one-to-one correspondence remains fixed until user modification, and wherein the channel number range destination window includes a plurality of displayed groups of channel numbers, each displayed group having a prescribed range of channel numbers, which is different for each displayed group, and the channel numbers arranged within the channel guide window correspond to the prescribed range of one of the displayed groups that is selected by the user.

2. The method of claim 1, wherein a content information of the initial screen of the Internet site is periodically updated and stored by obtaining the content information from the Internet site.

3. The method of claim 1, wherein the one of the displayed groups that is selected by the user among the plurality of displayed groups is displayed to be different from the displayed groups that are not selected by the user in color and brightness and to have a three-dimensional outline.

4. The method of claim 1, wherein the Internet site search menu further comprises a goto window including a plurality of goto keys for moving to the addresses of the Internet sites corresponding to the channel numbers.

5. The method of claim 4, further comprising displaying the channel number corresponding to the goto key selected by the user among the goto keys in the form of an on screen display (OSD).

6. The method of claim 4, wherein each goto key of the goto window is associated with the Internet site corresponding to the channel number.

7. The method of claim 1, wherein the Internet site search menu further comprises a registration/modification/deletion window including a registration key for registering the Internet site desired by the user by a channel number, a modification key for modifying the Internet site, and a deletion key for deleting the Internet site.

8. The method of claim 7, wherein the registration/modification/deletion window includes windows for inputting, selecting, or changing the titles of the respective Internet sites and an address and channel number of the corresponding Internet site, a confirm key for registering or modifying a corresponding input or change content and confirming the registered or modified content, and a cancellation key for canceling the registered or modified content.

9. The method of claim 7, further comprising:
   displaying a deletion warning message on the screen of the television; and
   deleting the corresponding Internet channel when the user clicks a deletion key in the registration/modification/deletion window.

10. The method of claim 7, further comprising:
    the user respectively assigning channel numbers to one or more Internet sites and registering the channel numbers through the registration/modification/deletion window; and
    storing the addresses of the Internet sites corresponding to the registered channel numbers.

11. The method of claim 1, wherein the channel numbers of the channel guide window are arranged in a column, and the channel numbers increase from top to bottom of the search menu.

12. The method of claim 1, wherein the channel numbers within the prescribed range increase from top to bottom of the search menu.

13. An apparatus for displaying a video and audio information of an Internet site on a screen of a television, comprising:
    a memory for storing Internet site information including the video information, the audio information, and an initial screen of a previously stored Internet site corresponding to an address of the Internet site, said screen also including a channel number corresponding to the Internet site;
    a microcomputer for receiving the video and audio information corresponding to the address of the Internet site and outputting a control signal when an Internet channel guide key signal is input by a user;
    an Internet site search menu generator for receiving the control signal and generating and outputting an Internet site search menu that includes a channel update selection window for periodically updating the video information and the audio information of the Internet site corresponding to the channel number desired by the user among channel numbers;
    a video processor for displaying the Internet site search menu on the screen of the television according to the control signal, and displaying the initial screen of the Internet site on the screen of the television according to the control signal when the user selects an Internet mode; and
    an audio processor for outputting the Internet site search menu by audio according to the control signal,
    wherein the displayed Internet site search menu further includes a channel guide window having the channel numbers, each channel number having a one-to-one correspondence to a tide of the Internet site and the one-to-one correspondence remains fixed until user modification, and wherein the displayed Internet site search menu further includes a channel number destination window for arranging the channel numbers in the channel guide window and having a plurality of displayed groups of channel numbers, each displayed group having a prescribed range of channel numbers, which is different for each displayed group, and the channel numbers arranged within the channel guide window correspond to the prescribed range of one of the displayed groups that is selected by the user.

14. The apparatus of claim 13, wherein the microcomputer periodically updates a content of an initial screen of the Internet site and the content information is stored by obtaining the content information from the Internet site.

15. The apparatus of claim 13, wherein the one of the displayed groups that is selected by the user among the plurality of displayed groups is displayed to be different from the displayed groups that are not selected in color and brightness or to have a three-dimensional outline.

16. The apparatus of claim 13, wherein the Internet site search menu further comprises a goto window including a plurality of goto keys for moving to the addresses of the Internet sites corresponding to the channel numbers.

17. The apparatus of claim 16, wherein the video processor displays the channel number corresponding to the goto key selected by the user among the goto keys in the form of on screen display (OSD) according to the control signal.

18. The apparatus of claim 16, wherein each goto key of the goto window is associated with the Internet site corresponding to the channel number.

19. The apparatus of claim 13, wherein the Internet site search menu further comprises a registration/modification/deletion window including a registration key for registering the Internet site desired by the user by a channel number, a modification key modifying the Internet site, and a deletion key for deleting the Internet site.

20. The apparatus of claim 19, wherein the registration/modification/deletion window includes windows for inputting, selecting, or changing titles of the respective Internet sites and the address and channel number of a corresponding Internet site, a confirm key for registering or modifying a corresponding input or change content and confirming the registered or modified content, and a cancellation key for canceling the registered or modified content.

21. The apparatus of claim 19, wherein the video processor displays a deletion-warning message on the screen of the television and deletes the channel of the corresponding Internet channel from the memory when the user clicks a deletion key in the registration/modification/deletion window.

22. The apparatus of claim 19, wherein the Internet site search menu lets the user assign the respective channel numbers to one or more Internet sites and register the channel numbers through the registration/modification/deletion window and store the addresses of the Internet sites corresponding to the registered channel numbers.

23. The apparatus of claim 13, wherein the channel numbers of the channel guide window are arranged in a column, and the channel numbers increase from top to bottom of the search menu.

24. The apparatus of claim 13, wherein the channel numbers within the prescribed range increase from top to bottom of the search menu.

* * * * *